US010586066B2

(12) United States Patent
Niu et al.

(10) Patent No.: US 10,586,066 B2
(45) Date of Patent: Mar. 10, 2020

(54) INTEROPERABILITY BETWEEN CONTENT MANAGEMENT SYSTEM AND COLLABORATIVE CONTENT SYSTEM

(71) Applicant: Dropbox, Inc., San Francisco, CA (US)

(72) Inventors: Boyang Niu, San Francisco, CA (US); Ken Elkabany, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 269 days.

(21) Appl. No.: 15/789,958

(22) Filed: Oct. 21, 2017

(65) Prior Publication Data

US 2019/0121995 A1 Apr. 25, 2019

(51) Int. Cl.
*G06F 21/62* (2013.01)
*H04L 29/08* (2006.01)
*H04L 29/06* (2006.01)
*G06F 16/21* (2019.01)

(52) U.S. Cl.
CPC ........ *G06F 21/6218* (2013.01); *G06F 16/219* (2019.01); *G06F 21/6209* (2013.01); *H04L 65/4015* (2013.01); *H04L 67/1095* (2013.01); *G06F 2221/2147* (2013.01)

(58) Field of Classification Search
CPC .............. G06F 21/6218; G06F 16/219; G06F 2221/2147; G06F 21/6209; H04L 67/1095; H04L 65/4015
See application file for complete search history.

(56) References Cited

U.S. PATENT DOCUMENTS

| | | | | |
|---|---|---|---|---|
| 5,761,669 | A * | 6/1998 | Montague | G06F 21/604 707/758 |
| 5,956,715 | A * | 9/1999 | Glasser | G06F 21/6218 |
| 9,542,391 | B1 * | 1/2017 | Eisner | G06F 16/1767 |
| 9,674,194 | B1 * | 6/2017 | McClintock | H04L 63/10 |
| 9,778,968 | B1 * | 10/2017 | Allen | G06F 9/5011 |
| 2007/0276834 | A1 * | 11/2007 | Chase | G06F 21/6227 |
| 2009/0031418 | A1 * | 1/2009 | Matsuda | G06F 12/1483 726/21 |
| 2009/0132537 | A1 * | 5/2009 | Denton | G06F 21/604 |

(Continued)

*Primary Examiner* — Theodore C Parsons
*Assistant Examiner* — Thomas Ho
(74) *Attorney, Agent, or Firm* — Fenwick & West LLP

(57) ABSTRACT

A content management system and a collaborative content system implement interoperability features that allow a user to perform certain interactions with a collaborative content item via the interface of the content management system. For instance, the collaborative content system can outsource access permissions for the collaborative content item to the content management system. When the collaborative content system receives a user's request to access the collaborative content item, the collaborative content system requests permissions data for the collaborative content item from the content management system and then determines based on the permissions data whether to grant access to the user. The content management system can also outsource the account storage capacity for the collaborative content item to the collaborative content system. As a result, a collaborative content item that is stored in association with a user account on the content management system is not counted against the user account's storage capacity.

18 Claims, 10 Drawing Sheets

(56) References Cited

U.S. PATENT DOCUMENTS

| | | | |
|---|---|---|---|
| 2012/0030354 A1* | 2/2012 | Razzaq | G06F 21/335 |
| | | | 709/225 |
| 2013/0072160 A1* | 3/2013 | Lawson | H04L 63/102 |
| | | | 455/411 |
| 2014/0115116 A1 | 4/2014 | Motes et al. | |
| 2014/0270530 A1 | 9/2014 | Dwan et al. | |
| 2014/0351346 A1 | 11/2014 | Barton | |
| 2016/0063270 A1* | 3/2016 | Brock | G06F 21/6218 |
| | | | 726/28 |
| 2017/0085591 A1* | 3/2017 | Ganda | H04L 63/20 |
| 2017/0201521 A1* | 7/2017 | Bruno | H04L 63/0861 |
| 2017/0235466 A1* | 8/2017 | Tanwir | G06Q 10/067 |
| | | | 715/738 |
| 2017/0331893 A1 | 11/2017 | Crofton et al. | |
| 2017/0353466 A1* | 12/2017 | Weaver | G06F 21/6218 |
| 2018/0026984 A1* | 1/2018 | Maker | H04L 67/10 |
| | | | 726/4 |
| 2018/0219916 A1* | 8/2018 | Tannu | H04L 63/20 |

* cited by examiner

Draft Speech

Here is the draft of the speech. @Bill_Seward, @John_Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

---

New Comment...

Comments (6)

Share

Edward Everett   12/15/10 at 11:05 pm
You say in two minutes what would take me two hours. Well done.

Bill Seward   12/15/10 at 11:10 pm
Certainly the bloodiest...
2 more comments

John Hay   12/15/10 at 11:1pm
What happened to "It is altogether fitting and proper that we should do this." ???
Reply George Bancroft   12/15/10 at 11:05 pm
I would like to use this in fundraising for soliders.
@Bill_Seward your thoughts?
Reply

*FIG. 5A*

Draft Speech ✏ 531

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate — we can not consecrate — we can not hallow, this ground — The brave men, living and dead, who struggled here, have hallowed it, far above our poor power to add or detract. The world will little note, nor long remember what we say here; while it can never forget what they did here.

---

Share

Comments (7) — 528

New Comment...

John Nicolay  12/16/10 at 8:25 am
I like this version better than the first draft @file
Reply Edward Everett  12/15/10 at 11:05 pm
You say in two minutes what would take me two hours. Well done.

Bill Seward  12/15/10 at 11:10 pm
Certainly the bloodiest...
2 more comments

John Hay  12/15/10 at 11:1pm
What happened to "It is altogether fitting and proper that we should do this." ???
Reply George Bancroft  12/15/10 at 11:05 pm
I would like to use this in fundraising for soliders.
@Bill_Seward your thoughts?
Reply

*FIG. 5B*

Recent docs

620 ⎧
606A — Draft Speech
Shared with Edward Everrett and Bill Seward · You viewed 5 days ago 606B — Draft Opinion: Gibbons v. Ogden
Shared with John Marshall · You viewed 7 days ago · Edited 7 days ago 606C — A Brief History of Steel Production in Ohio
Shared with Robert Jackson · You viewed 10 days ago · Edited 11 days 606D — Proposed Footnote for Carolene Products Opinion
Shared with Harlan F. Stone · You viewed 13 days ago · Edited 13 days 606E — The Effects of Education on Interstate Commerce
Shared with William Rehnquist · You viewed 14 days ago · Edited 17 da 608  610  612
Created by me    Shared with m

614 — 604

| Draft Opinion: Gibbons v. Ogden | |
|---|---|
| John Marshall commented<br>How do you like this ending? | 1 day ago |
| John Marshall commented<br>The enumeration . . . | 2 days ago |
| John Marshall commented<br>Please edit this part | 2 days ago |
| A Brief History of Steel Production in Ohio | |
| Robert Jackson commented<br>I see a zone of twilight. | 4 days ago |
| Robert Jackson commented<br>What does Hugo think about this? | 5 days ago |
| Draft Speech | |
| George Bancroft commented<br>@Bill Seward your thoughts? | 5 days ago |

616

File Level Comments

John Nicolay   12/15/10 at 11:05 pm
I like this version better than the first draft George Bancroft   12/15/10 at 11:09 pm
Did anyone check the math re 4 score + 7? @file Reply

INTEROPERABILITY BETWEEN CONTENT MANAGEMENT SYSTEM AND COLLABORATIVE CONTENT SYSTEM

TECHNICAL FIELD

The disclosed embodiments generally relate to interoperability features between a content management system and a collaborative content system.

BACKGROUND

Online collaborative sharing of documents is typically provided by a network-based file sharing computer system that allows multiple users to access and edit the files. Generally, documents are created and edited by a specific type of native application, such as a word processor or spreadsheet application. Many such applications provide support for co-editing a single document among many users.

SUMMARY

A collaborative content system outsources access permissions for a collaborative content item to a content management system. The collaborative content system receives an access request from a requesting user to access the collaborative content item. The collaborative content item is stored on the collaborative content system. The collaborative content system requests permissions data associated with the collaborative content item from the content management system. The permissions data identifies a set of users that can access the collaborative content item. The collaborative content system receives the permissions data and determines whether to grant access to the second user based at least in part on whether the second user is identified in the received permissions data.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5A shows an example user interface of a collaborative content item page including various comments.

FIG. 5B shows an example user interface with a file-level comment associated with the title of the collaborative content item.

FIG. 6A shows an example user interface with a plurality of collaborative content items, a list of notifications, and file level comments.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
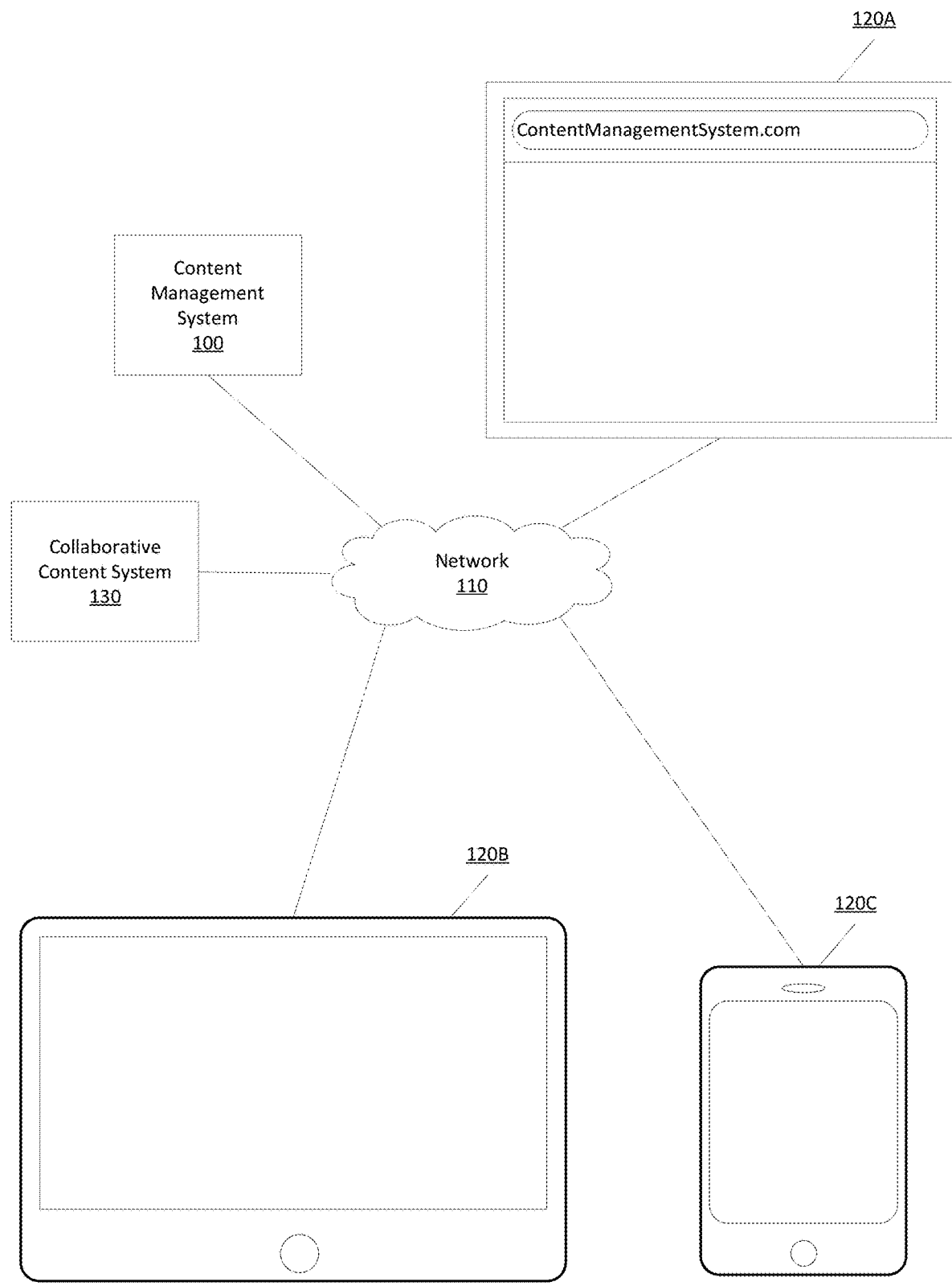
FIG. 1 shows a diagram of a system environment of a content management system and a collaborative content system according to one embodiment.

FIG. 1 shows a system environment including content management system 100, collaborative content system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content system 130 are combined into a single system. The system may include one or more servers configured to provide the functionality discussed herein for the systems 100 and 130.

Client Device

Figure 2:
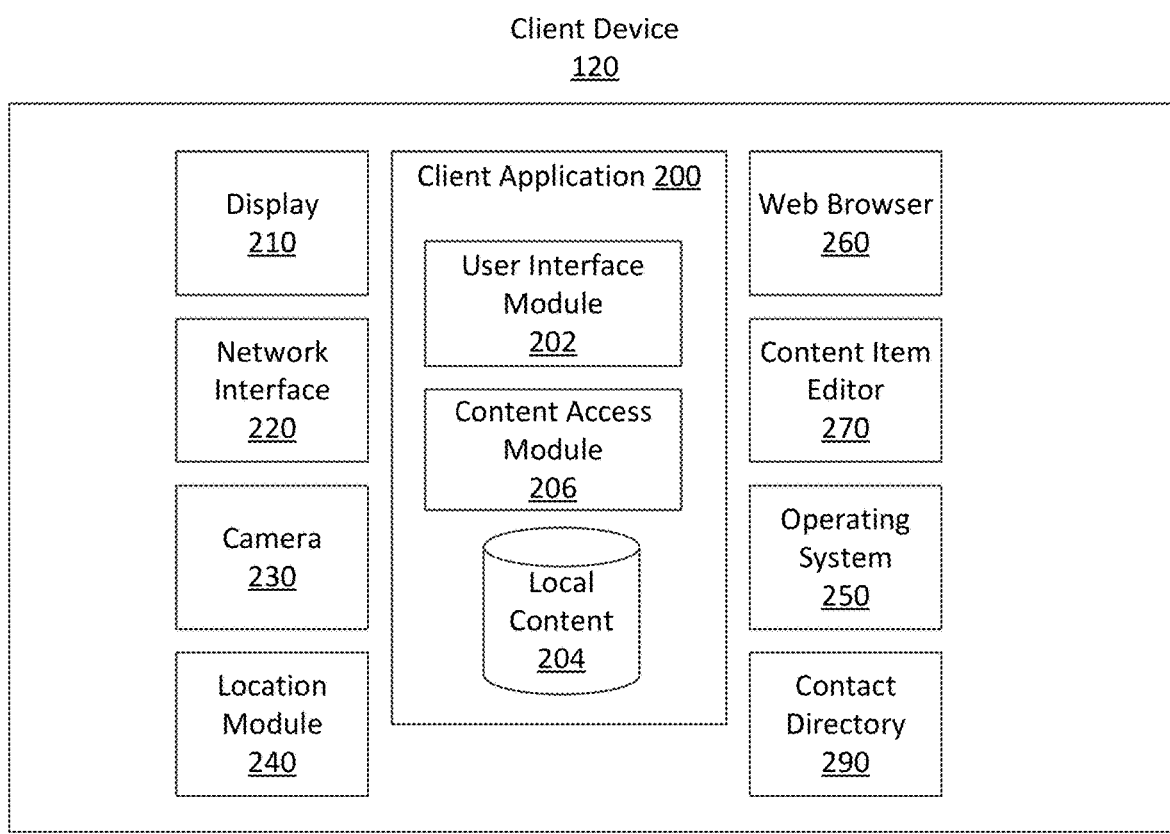
FIG. 2 shows a block diagram of components of a client device, according to one example embodiment.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at content management system 100 is represented at the client device 120 as a local file structure by operating system 250 in conjunction with client application 200.

Client application 200 manages access to content management system 100 and collaborative content system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
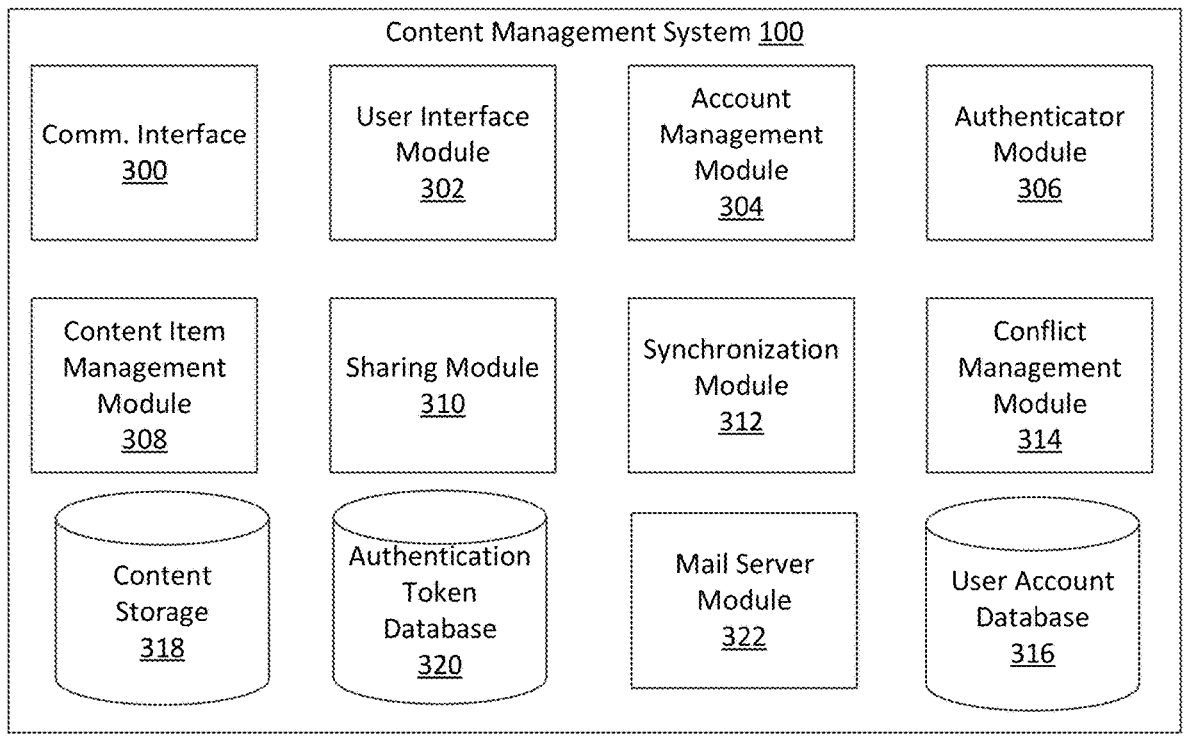
FIG. 3 shows a block diagram of a content management system, according to one example embodiment.

FIG. 3 shows a block diagram of content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as document files, spreadsheet files, audio files, video files, etc., from one or more client devices associated with the account. The content items stored in an account may also include collaborative content items. Additionally or alternatively, an account may also store an object comprising a link to a collaborative content item without storing the collaborative content item itself. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In some embodiments, content management system 100 can include a mail server module 322. The mail server module 322 can send (and receive) collaborative content items to (and from) other client devices using content management system 100. The mail server module can also be used to send and receive messages between users in content management system 100.

Collaborative Content System

Figure 4:
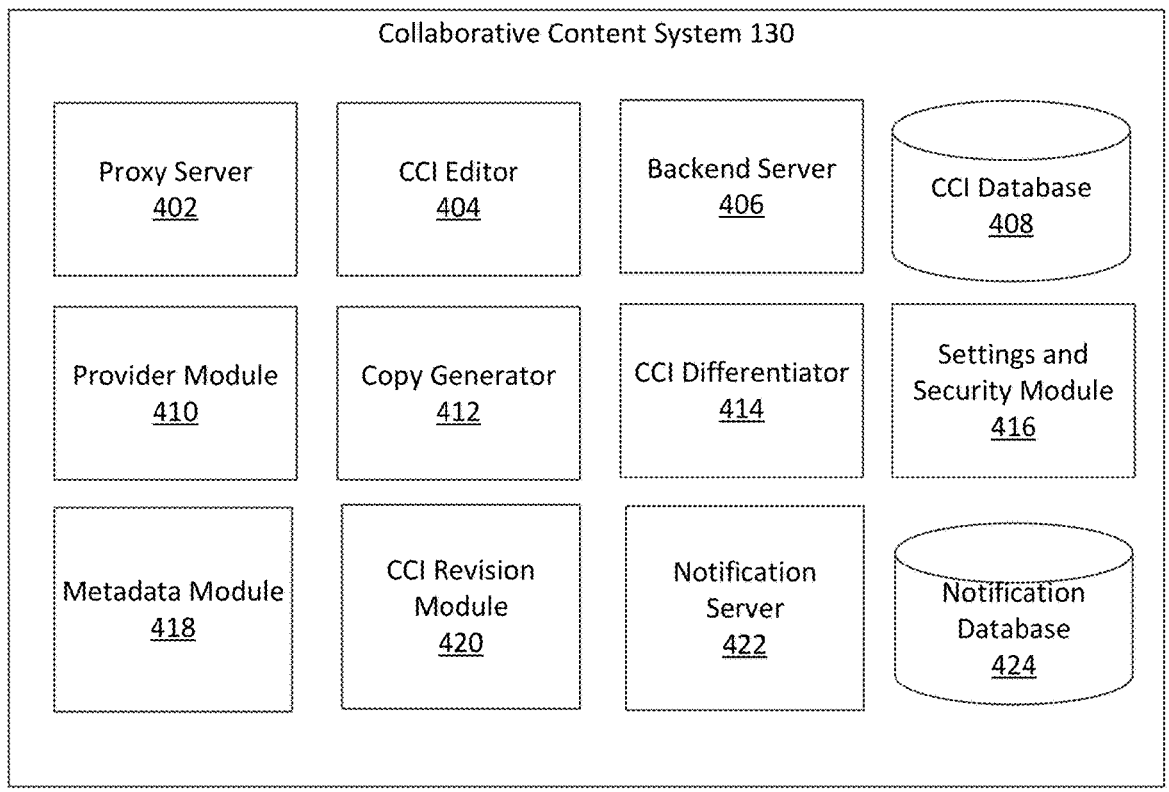
FIG. 4 shows a block diagram of a collaborative content system, according to one example embodiment.

FIG. 4 shows a block diagram of collaborative content system 130, according to one embodiment. Collaborative content items can be files that users can create and edit using a collaborative content items editor 270 and can contain collaborative content item elements. Collaborative content item elements may include any type of content such as text; images, animations, videos, audio, or other multimedia; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content system 130 is shown as separate from content management system 100 and can communicate with it to obtain its services. In other embodiments, collaborative content system 130 is a subsystem of the component of content management system 100 that provides sharing and collaborative services for various types of content items. User account database 316 and authentication token database 320 from content management system 100 are used for accessing collaborative content system 130 described herein.

Collaborative content system 130 can include various servers for managing access and edits to collaborative content items and for managing notifications about certain changes made to collaborative content items. Collaborative content system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In an alternative embodiment, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In one embodiment, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within content management system 100 (i.e., author, recipient, time created, etc.). In one embodiment, the access module can also provide the access link to user accounts via the network 110, while in other embodiments the access link can be provided or made accessible to a user account and is accessed through a user account via the client device. In one embodiment, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of collaborative content system 130 to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In one embodiment, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, content management system 100, and collaborative content system 130. Additionally, the settings and security module 416 can manage security during interactions between modules of collaborative content system 130. For example, when a client device 120 attempts to interact within any module of collaborative content system 130, the settings and security module 416 can manage the interaction by limiting or disallowing the interaction. Similarly, the settings and security module 416 can limit or disallow interactions between modules of collaborative content system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content system 130, client devices 120, or collaborative content items.

The metadata module 418 manages metadata within with collaborative content system 130. Generally, metadata can take three forms within collaborative content system 130: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differntial collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content system 130 may be implemented using a single computer, or a network of computers, including cloud-based computer implementations. The operations of content management system 100 and collaborative content system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content system 130 are sufficiently complex as to require implementation on a computer system, and cannot be performed in the human mind simply by mental steps.

Comment Management User Interface

Referring now to FIG. 5A, there is shown an example user interface with page of a collaborative content item 502 entitled "Draft Speech" in which several comments 504 associated with the collaborative content item have been made. In this example, a collaborative content item 502 is composed of content such as lines of text, which can be arranged such as in paragraph blocks 508, and may include any other form of media, such as images, videos, spreadsheets, executable or interpretable code, and so forth.

Content Level Comments

A collaborative content item 502 can have zero or more content level comments 504. Content level comments can be associated with specific portions of a collaborative content item. The presence of content level comments 504 within the content item may be indicated by underlined (or colored underlined) portions 510 of content, though any other formatting may be used to indicate the presence of a content level comment 504 (e.g., lines connecting the content level comments to the content item, comment numbers in superscript form, highlighting, a "hover over" display indicator etc.). The portion 510 of content with which a content level comment is associated is also called a span. Content level comments 504 can be associated with overlapping spans; the first and second content level comments 504a, 504b are applied to the span "Now we are engaged in a great civil war, testing whether that nation, or any nation so conceived, and so dedicated, can long endure" and the third comment 504c is associated with just the span "This we may, in all propriety do."

The content level comments 504 can be arranged in a comment pane 512 positioned to the side of the body of the collaborative content item 502. Each content level comment 504 has an author 514 (indicated by user name) and a creation date and time. A collection of comments that together form an exchange between users with respect to a single span is a thread 518. Threads are displayed proximate the span that is associated with the thread. In the example of FIG. 5A, there are three threads, 518a, 518b, and 518c; thread 518a has a total of four comments (two shown, and "2 more comments" as indicated) and the other threads have one comment each.

A user may create a new comment or reply to existing comment. To create a comment, a user selects a span in the content item, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the collaborative content item. A user may also create a comment to include in a thread by entering text into a reply field 516 in one of the comments 504, such as the most recent comment in a thread 518.

When a user opens a collaborative content item initially, the comment pane 512 can be closed such that the comments therein are hidden. The user can activate the comment pane 512 to show the content level comments by selecting text (e.g., double clicking) text that is formatted or otherwise indicated as having an associated comment. In some implementations, the comment pane 512 can be visible when a collaborative content item is opened. The pane 512 includes a counter 524 of the current number of content level comments in the collaborative content item that are visible to the user. Each comment can have a state, as to whether the comment is active or resolved. The counter 524 serves as a menu that the user can select from to filter the comments so as to show all comments, active comments or resolved comments.

A collaborative content item may also include a share icon 526 that allows a user to share the collaborative content item with other users of content management system 100. Upon clicking on the share icon 526 a sharing interface is displayed to the user. The sharing interface can include a field for adding user names or email addresses to the list of users with which the collaborative content item is to be shared. The sharing interface may also include a text field to allow the sharing user to send a message to users receiving the request to share the collaborative content item.

User Primitives

In some embodiments, collaborative content system 130 is configured to recognize particular text patterns as functional primitives that activate various functions of collaborative content system 130. One type of functional primitive is a user primitive. A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user.

In one embodiment, the user primitive takes the form of @username where the "@" symbols is a predetermined token indicates to collaborative content system 130 that the following string username is the user name of a system user. Referring to FIG. 5A, several examples of user primitives 520 are illustrated. First in the text of the collaborative content item, the first sentence includes the user primitives "@Bill_Seward" and "@John_Hay. The user primitive "@Bill_Seward" is also shown in the text of comment 504d. Collaborative content system 130 recognizes these primitives as it processes the text of the collaborative content item and comments.

When a user primitive indicating a specific user appears in the span for a thread, or the text of a comment, collaborative content system 130 includes the userID for the indicated user in the audience for thread containing the comment. This allows the mentioned user to see the entire thread in which they are mentioned when accessing the collaborative content item (since access to the thread when opening a collaborative content item is determined by presence of a user's ID in the audience), as well for a mechanism to notify the user, as next described.

In one embodiment, when a user primitive occurs elsewhere in the collaborative content item, but outside of the span for the thread, the userID for the mentioned user is included in the audience. For example, if a user is mentioned in the same paragraph as the span for a thread, the userID for the user is included in the audience.

Contextual Primitives

In addition to user primitives, collaborative content system 130 may also support contextual primitives. Contextual primitives function in a similar way to user primitives, however, instead of adding a single user to the audience of a thread, contextual primitives can add a group of users, or user(s) assigned to a specific role (e.g., owner, editor, etc.), to the audience of a thread using document context. A contextual primitive is indicated by a predetermined token followed by a predetermined text string. Each predefined text string may incur different functionality from collaborative content system 130. A user inserts the contextual primitive as they are editing the content item.

In some implementations, including the @doc primitive can cause every user with access to the collaborative content item to be included in the audience of a thread that includes the primitive. An algorithm to achieve this functionality is as follows. Collaborative content system 130 detects the "@doc" text string in the span of a thread or in a comment content and accesses the collaborative content item index of the collaborative content item database 408. Collaborative content system 130 determines the userIDs with viewing privileges for the collaborative content item according to the collaborative content item index and adds those userIDs to the audience_list for the thread. Alternatively, as discussed below, the system can include an entry in the collaborative content item audience list indicating that multiple users such as all users, authenticated users, users that are part of a particular group, etc., should be included as audience members. When the collaborative content item is subsequently accessed, the thread including the "@doc" primitive will be visible to all users viewing the collaborative content item. Additionally, any notification generating activity in the thread will be reported to all users in the collaborative content item.

In some embodiments, the "@doc" primitive is dynamic such that any users that are added to the collaborative content item even after the thread has been created will be able to view the comment thread. This may be accomplished by reevaluating the span of a thread and the comment text of a thread each time the collaborative content item is compiled. Alternatively, instead of adding userIDs to the audience_list of a thread directly, collaborative content system 130 may create a special ID value indicating that the "@doc" primitive has been used. Therefore, during compilation of the collaborative content item, collaborative content system 130 checks to see if a particular thread should be displayed to a viewing user by referencing the audience_list of the thread. If collaborative content system 130 detects the special ID associated with the "@doc" primitive it will reference the collaborative content item database 408 to determine which users have viewing permissions. If the user ID of the current user is included in the collaborative content item database 408 then collaborative content system 130 displays the thread to the current user.

In addition the collaborative content item audience primitive, other contextual primitives may be implemented:

The "@folder" primitive informs collaborative content system 130 that all users with access to the folder that includes the collaborative content item should be able to view the thread. In this case, some of the users that have access to the folder may not have access to the collaborative content item. In this case, collaborative content system 130 may grant all users with access to the folder access to the collaborative content item, provide a separate interface for users without access to the collaborative content item to view the thread, or it may provide the users without access to the collaborative content item with notifications regarding the thread over email.

The "@editing" primitive indicates that all users with editing access to the collaborative content item are to be included in the audience for a thread. Collaborative content system 130 parses this in the same way as the "@doc" primitive. However, instead of retrieving all users associated with the collaborative content item in the collaborative content item index only users with editing access are added to the audience_list for the thread. The "@sharing" primitive (only users with sharing privileges are added to the audience_list) functionality is implemented in a similar manner.

The "@threads" primitive adds all users that have participated in threads in the collaborative content item already to the audience_list of the current thread. To accomplish this, upon detecting the "@threads" primitive collaborative content system 130 accesses each thread object associated with the collaborativeContentItemID and adds any users listed in the audience_list of those threads the audience list of the current thread.

Depending on the embodiment, the specific text string associated with the primitive may be different. A user may also define their own contextual primitive using the client application to select users, categories of users, and contextual categories of users to be included in the primitive. Additionally, and contextual primitive may be made dynamic using a special ID in the audience_list which triggers a reevaluation of the audience list during compilation of the collaborative content item.

File-Level Comment Interfaces

Collaborative content system 130 also enables file-level commenting and may utilize a number of user interfaces depending on the embodiment. A file-level comment is associated with the file itself and persists with the file until the file is deleted or the comment itself is deleted. This allows for conversations between users to occur on a file-level that persists with each iteration on the file. The methods described herein, also allow for the simultaneous display of the collaborative content item and file-level comments so a user can review the collaborative content item and make comments on the collaborative content item without having to change windows. File-level comments have many of the same characteristics as the content level comments and rely on the same underlying data structure. However, file-level comments are not associated with a span of the collaborative content item and are instead associated with the entirely of the content item. Despite these differences, file-level comments may be used to form threads and have an associated author, creation time and date, which may be displayed in a similar fashion as in content level comments depending on the embodiment.

Because file-level comments are not associated with a particular span of the collaborative content item, different UI elements may be used to display the file-level comments. FIG. 5B illustrates an embodiment for creating and displaying file-level comments.

FIG. 5B shows an example user interface with a file-level comment associated with the title of the collaborative content item. FIG. 5B displays the same six comments and four threads as in FIG. 5A, with the addition of a file-level comment 528. The file-level comment is displayed alongside the content level comments in the comment pane 512. Instead of being for a particular span in the collaborative content item, as with the content level comments, the file-level comment 528 is associated with the entire document, and is indicated in the collaborative content item by visually distinguishing features 531, such as formatting or highlighting, borders or the like to the title of the collaborative content item 530. Optionally, the same visually distinguishing features can be applied to the comment itself, so that the user knows that which comments are associated with the file and which with specific spans of the content item. FIG. 5B also illustrates the use of a file-level primitive 532, "@file", to indicate that a comment is file-level comment rather than a content level comment.

User Interface for Displaying a List of Notifications

FIG. 6 shows an example user interface with a list of collaborative content items 602 and a list of notifications 604. This user interface allows a viewing user to view the collaborative content items to which the viewing user has been granted access (hereinafter "the user's collaborative content items"). As referred to herein, the "viewing user" is the user viewing the user interfaces described herein. In this example, collaborative content system 130 has granted the viewing user access to multiple collaborative content items, including the five collaborative content items 606A through 606F shown in the "recent docs" tab 608 of the user interface. The user interface also includes "created by me" and "shared with me" tabs 610, 612 that the viewing user can select to access additional lists of collaborative content items.

When other users make certain types of changes to the viewing user's collaborative content items, collaborative content system 130 generates a notification of the change. Collaborative content system 130 defines one or more triggering actions. A triggering action is a change made by another user that causes collaborative content system 130 to create a notification about the change and provide the notification to the client device of the viewing user. For example, a triggering action may occur when another user adds or alters a portion of the collaborative content item, or adds a comment to a thread, for example in a thread that already includes a comment added by the viewing user.

The client application 200 receives notifications from collaborative content system 130 and can display a notification in a variety of ways. One way of displaying a notification is the notification list 604 shown in FIG. 6. The notification list 604 includes notifications for several of the viewing user's collaborative content items, and it is displayed when the viewing user selects the notification icon 614. In the example shown in FIG. 6, the notifications in the notification list 604 are sorted by the age of collaborative content item, and the notifications for each collaborative content item are sorted from most recent to least recent.

The client application 200 displays each notification in the notification list 604 with notification text and a short phrase indicating whether the notification relates to a comment or a portion of text in the collaborative content item content. Although not explicitly shown in FIG. 6, each notification can also include a content span and a notification link. The content span associates the notification with a span of content in a collaborative content item 502. The notification link is a link to the collaborative content item and includes a pointer to the content span. A user input selecting a notification in the notification list 604 selects the link. The selection of the link causes the client application 200 to open the collaborative content item to a position where the content span is visible. As a beneficial result and improvement in functionality, the user does not have to scroll through the collaborative content item to find the change that was the subject of the notification.

Referring to the final notification 616 in the notification list 604 as an example, the notification text is the user primitive "@Bill_Seward" and the adjacent text "your thoughts." A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user. In one embodiment, the user primitive takes the form of @username where the "@" symbol is a predetermined token that indicates to collaborative content system 130 that the following string "username" is the user name of a system user. In some implementations, other predetermined tokens can be used to indicate a primitive. If the user selects this notification 616, the notification link causes the client application 200 to open the collaborative content item 502 shown in FIG. 5A to a position where the span 510b is visible.

If the notification is generated in response to a file-level comment, the file-level comment may have no associated span in the associated collaborative content item or may set the span to be the collaborative content item title. The link included in the notification may open the collaborative content item displaying the beginning of the content or the title. [0090] In addition to displaying notifications for file-level comments in notification list 604, the client application 200 may also display a file-level thread pane 618, which displays file-level comment threads corresponding to a selected collaborative content item 620. In some implementations, file-level thread pane 618 can display file-level comment threads corresponding to multiple selected collaborative content items. In some implementations, file level thread pane 618 can display file-level comment threads corresponding to multiple of collaborative content items 606, whether or not the collaborative content items are selected. In the illustrated example, file-level comments from the collaborative content item titled "Draft Speech" are displayed in the file-level thread pane 618. In some embodiments, users may utilize the file-level thread pane 618 to add or reply to file-level comments without opening the associated collaborative content item. [0091] In various implementations, any of collaborative content items, the associated comments, or collaborative content item file structure and other metadata can be locally stored on a client device. For example, content can be downloaded from collaborative content system 130 for use in an offline mode. The inclusion of a file-level thread pane 618 may be especially beneficial for this offline use where file-level comments may be downloaded for offline viewing in the file-level thread pane 618. This would allow users to receive some information about collaborative content items without having to store the enter contents of the collaborative content items locally. For example, users may view file-level comments for collaborative content items listed in file-level thread pane 618, without requiring the collaborative content items to also be locally stored.

Database Structures

Figure 6B:
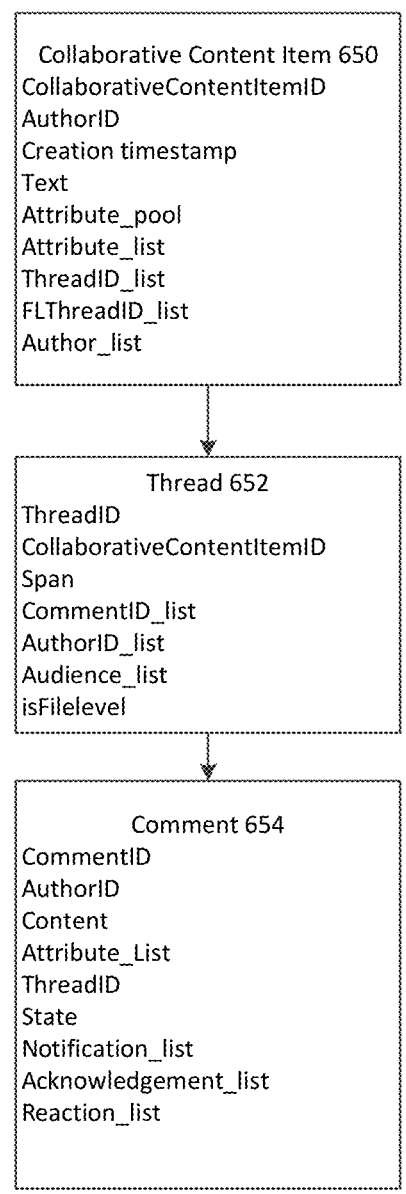
FIG. 6B shows an embodiment of the data structures for collaborative content items, comments, and comment threads.

Referring to FIG. 6B, collaborative content item database 408 (CCI database) stores the collaborative content items, content level and file-level comments, and threads as database entities, and provides programmatic access thereto for searching and retrieving these entities and is one means for performing these functions. The CCI database 408 can be implemented in a relational form using separate tables for collaborative content items, threads, and comments, or using objects, BLOBs, files, or other structures. Additionally, the CCI database 408 may provide a folder hierarchy storage system separate from content management system 100. In this case, folders would be saved as an additional data structure in the CCI database 408.

Each collaborative content item data element 650 is composed of a number of elements. In one embodiment, the elements are as follows:

CollaborativeContentItemID: a unique identifier assigned by collaborative content system 130 to access the collaborative content item.

AuthorID: the userID of the user who created the collaborative content item, and may include the username of the user. These values may be encrypted for privacy.

Creation timestamp: indicates the date and time that the collaborative content item was created.

Text: The text of the collaborative content item is represented as string of ASCII characters.

Attribute pool: Formatting attributes (e.g., bold, underline, italics, font, font size, line spacing, paragraphs, and the like) that are used in the collaborative content item. The attribute pool is a set of attributeIDs used in the collaborative content item; a native set of attributeIDs and associated formats are provided by collaborative content system 130. The following table is an example of a portion of an attribute pool:

| Attribute ID | Formatting |
| --- | --- |
| 0 | None |
| 1 | Bold |
| 2 | Italic |
| 3 | Underline |
| 4 | Strikethrough |
| 5 | Superscript |
| 6 | Subscript |
| 7 | Single Space |
| 8 | Doublespace |
| ... | ... |

Attribute_list: Formatting attributes are applied to portions of a content item, such as text, by the attribute list. The attribute list element is a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the collaborative content item is coded for attributes. For example, the text "Text with bold, italic, and bold italic formatting." would be attribute coded as {10=0, 4=1, 2=0, 6=2, 6=0, 11=1 2, 12=0}.

ThreadID_list: a list of all threads that are associated with a collaborative content item. ThreadIDs in the ThreadID_list may represent threads of content level comments or threads of file-level comments.

FLThreadID_list: a list of all file-level threads 528 that are associated with a collaborative content item. Thus, the FLThread_list contains a subset of the threads in Thread ID list.

Author_list: a sequential list of the users who have contributed to the collaborative content item text, according to the sequence of contributed or edited text portions, using the same coding pattern as attribute list, i.e., (span=userID) pairs. For example, the author_list {100=199, 50=54, 200=199} indicates that in a text of 350 characters, there is a sequence of three text portions, the user with userID 199 authored the first portion with 100 characters, followed by userID 54 who authored the second portion with 50 characters, followed again by userID 199 who authored the third portion with the remaining 200 characters.

The span coding of the attributes and authors is beneficial because it allows for efficient management of insertions and deletions of content. For example, when text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example, with the userID of each author followed by a list of text portions edited by that user.

Each thread data element 652 is composed of a number of elements. In one embodiment thread data element 652 includes the following elements:

ThreadID: unique identifier assigned by collaborative content system 130.

CollaborativeContentItemID: the CollaborativeContentItemID of the file that contains the thread.

Span: a delineated portion of the content of the identified collaborative content item to which the thread applies. The delineated portion is defined based on the type of the content. For example, a span in text can be defined by the position of the first character in the span, and the length of the span (in number of characters); a span in an image can be defined by a bounding region, for example a set of (X,Y) coordinates, relative to the image origin that define a polygon within the region; a span in a spreadsheet can be defined by a range of cells by column and row numbers. For example, the span (50, 25) indicates a text portion starting at character position 50 within the collaborative content item and running 25 characters in length. As the content in the collaborative content item is edited, collaborative content system 130 updates the span element of each thread. For example, if a five-character portion of the text before the span (50, 25) is deleted, then content management system 100 will modify the span of the thread to (45, 25). It is also possible for users to delete text included in the span. If all of the text included in the span of a thread is deleted, then the span will have a null value and is removed by collaborative content system 130 (unless isFilelevel is True as described below).

In some implementations, only content level comments are associated with a span, in this case a thread of file-level comments may have a null value for a span accompanied by a True value for the is Filelevel element. This is one mechanism for a thread of comments to persist in the CCI database 408 until the thread of comments is deleted, no matter what other content in the collaborative content item is removed or edited. For example, the title of a collaborative content item can be modified (e.g., edited or deleted). This change may not affect the file-level comment, even though file-level comment can be displayed as being associated with the collaborative content item title. For example, if a collaborative content item title is deleted, a file-level comment can remain attached to a field or other designated title location within the collaborative content item. As another example, a user can edit a collaborative content item title. A file-level comment can remain attached to a designated title location within the collaborative content item that contains the edited collaborative content item title.

CommentID_list: a list element of commentIDs of the comment data elements (e.g., comment data elements 654) included in the thread corresponding to thread data element 652.

AuthorID_list: a list of userIDs of the authors of comments in the thread.

Audience_list. The Audience_list element is a list indicating the users to whom the thread and its comments are displayed when accessing the collaborative content item, and to whom notifications of changes in the thread are sent. The audience for a thread can be determined differently for file-level comments than for content level comments. In various implementations, the audience of a content level thread may comprise one or more of the userIDs of the i) the author of the collaborative content item containing the thread; ii) the authors of comments included in the thread; iii) the authors of any text included in the span for the thread; iv) any user mentioned in the span the thread via a user primitive (further described below); v) any user mentioned in a comment via user primitive; or vi) any user who has opened the collaborative content item; vii) any user who has edited the collaborative content item; or viii) any user who has created an association with the collaborative content item, such as by marking it as a favorite or followed collaborative content item. In some implementations, an audience for the thread may not be defined specifically for the thread, but instead may be identified dynamically as needed based on, e.g., user identifiers associated with the comments or with the collaborative content item. The inclusion of an audience for each thread allows for control of which users are notified of, and have access to specific comments as further described below.

isFilelevel: a value indicating whether the thread is a file-level thread (associated with the collaborative content item as a whole as opposed to a particular span) or whether the thread is a content level thread (associated with a particular span in the collaborative content item). Before deleting a content level thread for having a null span, collaborative content system 130 checks the isFilelevel value for the thread to determine whether it should be deleted. If isFilelevel is True, the thread will not be deleted. The isFilelevel element is also used to determine how a thread is displayed. If isFilelevel is True the thread is displayed in the collaborative content item as a file-level thread with no associated span. If isFilelevel is False then the thread is displayed as a content level thread and the associated span is highlighted in the collaborative content item.

Each comment data element 654 is composed of a number of elements. In one embodiment, comment data element 654 includes the following elements:

CommentID: a unique identifier assigned by collaborative content system 130.

AuthorID: the userID of the author of the comment.

Content: an element storing the content of the comment, which may include text, pictures, or other media.

Attribute_list: a list storing the formatting attributes for the text of the comment, in the same manner as described above for collaborative content items.

ThreadID: the threadID of the thread to which the comment belongs.

State: an enumerated variable storing a value indicating the state of the comment as either active or resolved.

Notification_list: the Notification_list element is a list of userIDs indicating the users to whom a notification of the comment has been sent, as further explained below. This list is updated each time a notification message including the comment is sent to specific user.

Acknowledgement_list: the Acknowledgement_list element is a list of userIDs indicating the status of each user with respect to the comment. For example, the Acknowledgement_list may indicate whether each user in the Audience_list of the thread has yet viewed the comment, has read the comment, acknowledges an instruction in the comment, or intends to respond later to the comment, or any other set of enumerated actions or status types. In various implementations, this list can be updated whenever the collaborative content editor 404 displays the comment to a user that has not yet seen the new comment or when a user selects a control in relation to a comment indicating the user's acknowledgement of the comment or the user's intention to respond to the comment. In some embodiments, the collaborative content editor 404 may display a visual indication of users that have viewed a particular comment proximate to the comment in the display. Additionally, collaborative content system 130 may provide UI elements for indicating status beyond applying a "read receipt" when a user views a comment for a first time.

Reaction_list: reactions are elements that represent reactions of each user in the audience of the thread to the comment. The reaction list comprises a list of reaction values paired with userIDs. In some embodiments, an interface for providing reactions to each comment is provided and a user may select a reaction using a pull down feature or another such UI feature. An enumerated set of reactions is natively provided (e.g., "Approve," "Disapprove", "Happy", "Angry", "Puzzled" with associated numeric codes 1 . . . 5). Upon selection of a reaction from a reaction interface the numeric code corresponding to the selected reaction is added to the reaction list. For example, reaction pair (345, 5) would indicate that the user with userID 345 had an angry reaction to the comment. In some embodiments, the collaborative content editor 404 displays a visual indication of each reaction proximate to the comment in the display.

User information is also stored as database entities. Each user includes the following elements:

DocumentID List: a list of collaborative content item identifiers accessible by the user of the user identifier.

RoomID_List: a list of room identifiers of comment rooms accessible by the user of the user identifier. A user may have access to multiple comment rooms for a single collaborative content item.

AnonymousUserID_list: a list of anonymous user identifiers associated with the user. An anonymous user identifier for the user may be generated for each of the collaborative content items based on the user identifier of the user and the document identifier of the collaborative content item. In some embodiments, anonymous user identifiers are not stored by the system, but instead are reconstructed based on the stored user identifier and document identifier.

ThreadID_list: a list of threads in which the user has posted a comment, or is otherwise allowed to access.

Avatar: an identifier that references an avatar, such as an image, associated with the user. The avatar is used as a representation of the user. The avatar may be presented when the user provides a comment or updates a collaborative content item to attribute changes to the user.

AnonymousAvatars_list: a list of anonymous avatars associated with anonymous user identifiers of the user. Each anonymous user identifier may be associated with a different anonymous avatar identifier. In some embodiments, anonymous avatars are not stored in association with users, but instead are referenced by the anonymous user identifier.

CCI database 408 may also include a set of indices. These indices are logical in nature and may be implemented in various ways, depending on the underlying database design. A user index contains a list of all users by their userID, and for each userID there is a list of collaborativeContentItemIDs. Each collaborativeContentItemID identifies a collaborative content item to which the user of the userID is associated and has access to. For each collaborativeContentItemID, there is a status indicator that indicates whether the collaborative content item is active or inactive for the user. A collaborative content item is active for the user sharing the collaborative content item until the user deletes the collaborative content item. In one embodiment, when the user deletes the collaborative content item, the collaborative content item persists in the collaborative content item database 408 remains associated with the user but status indicator is set to inactive, allowing the user to reactivate their sharing status with the collaborative content item in the future. The collaborative content item remains active for and associated with any other shared users. Alternatively, the collaborative content item may be deleted from the item database 408, so that none of the shared users have access to it anymore. The user index is used to identify collaborative content items associated with (shared with) a given user and the status of those collaborative content items with respect to the user. In some embodiments, a userID index also indicates the privileges the user has with respect to each document that the user is associated with. A value stored with each collaborativeContentItemID in the index indicates whether the user has editing privileges, viewing privileges, and/or sharing privileges.

Collaborative content item database 408 can include a collaborative content item index. The collaborative content item index indicates, for each document, a list of userIDs of users having access to the collaborative content item, and an indication of whether the user is active or inactive. This index can be an inverse of the user index and may be stored together with the user index. The collaborative content item index may also indicate the privileges of each user associated with the collaborative content item using an inverse implementation of the above described user index.

Overview of Interoperability Features Between Content Management System and Collaborative Content System Content management system 100 and collaborative content system 130 can be implemented as physically separate systems, for instance with collaborative content items stored on collaborative content system 130 and other types of content items, such as document files, spreadsheet files, image files, and video files, stored on content management system 100. In such an implementation, a user creates, views, and edits collaborative content items stored on collaborative content system 130 through an interface provided by collaborative content system 130 (e.g., the interfaces shown in FIGS. 5A, 5B, and 6A), but the same user may have to navigate to a separate interface to interact with content items stored on content management system 100. Being required to access separate interfaces in order to access content as described above can be inconvenient for the user, especially if the user is frequently switching back and forth between the two systems 100, 130.

However, it may also be undesirable or infeasible to fully integrate the functionality of the two systems 100, 130 into a single system for a number of different reasons. For example, content management system 100 and collaborative content system 130 may be operated by different entities. Alternatively, the two systems 100, 130 may be operated by the a single entity that wishes to keep the systems 100, 130 at least partially separate for branding purposes or because fully integrating the systems 100, 130 would require a large amount of engineering resources.

Rather than fully integrating the functionality of the two systems 100, 130, content management system 100 and collaborative content system 130 may instead implement a number of interoperability features that allow the systems 100, 130 to remain physically separate and capable of operating independently of each other, but also allow a user to perform certain interactions with a collaborative content item via the interface of content management system 100. For a collaborative content item stored on collaborative content system 130, the content management system 100 can store a linking object that contains a link to the collaborative content item. The linking object is displayed alongside content items stored on content management system 100, and the user can manipulate the linking object (e.g., by moving it into a folder, renaming it, or deleting it) in the same manner as the other content items. When the user performs an interaction to open the linking object, such as by performing a tapping gesture or double clicking on the linking object, the user is redirected from content management system 100 to collaborative content system 130, and collaborative content system 130 may display an interface that allows the user to view and edit the collaborative content item. In some embodiments, the interface displayed by collaborative content system 130 includes features (such as visual features, interactive features, and the like) similar to an interface displayed by content management system 100 such that a user, upon selecting the linking object and being redirected to the interface displayed by collaborative content system 130, may be unaware that the system displaying the interface changed from content management system 100 to collaborative content system 130.

This arrangement allows collaborative content system 130 to outsource access permissions for a collaborative content item to content management system 100. Content management system 100 stores permissions data in association with the linking object. The permissions data may be associated with the linking object itself or with a folder in which the linking object is stored. When a user attempts to access the collaborative content item via collaborative content system 130, collaborative content system 130 requests the permissions data from content management system 100 (e.g., via a call to an API provided by content management system 100) and determines whether to grant access to the user based on the permissions data. This allows collaborative content system 130 to operate without implementing separate permissions logic and storing separate permissions data for the collaborative content item, which can simplify the operation of collaborative content system 130. Alternatively, collaborative content system 130 may maintain separate permissions data for the collaborative content item and determine whether to grant access to the user based on both the permissions data received from content management system 100 and the permissions data maintained on collaborative content system 130.

Because the collaborative content item is stored on collaborative content system 130, content management system 100 can also outsource the account storage capacity for the collaborative content item to collaborative content system 130. User accounts on content management system 100 are associated with a storage capacity, and most content items stored by, for, or in association with the user account are counted against this storage capacity. However, when a user account stores a linking object representing the collaborative content item (stored by collaborative content system 130), the size of the collaborative content item is not counted against the user account's storage capacity on content management system 100. This is especially advantageous because a collaborative content item may include multimedia items such as images, animations, videos, and audio that can occupy a large amount of storage capacity.

Figure 7:
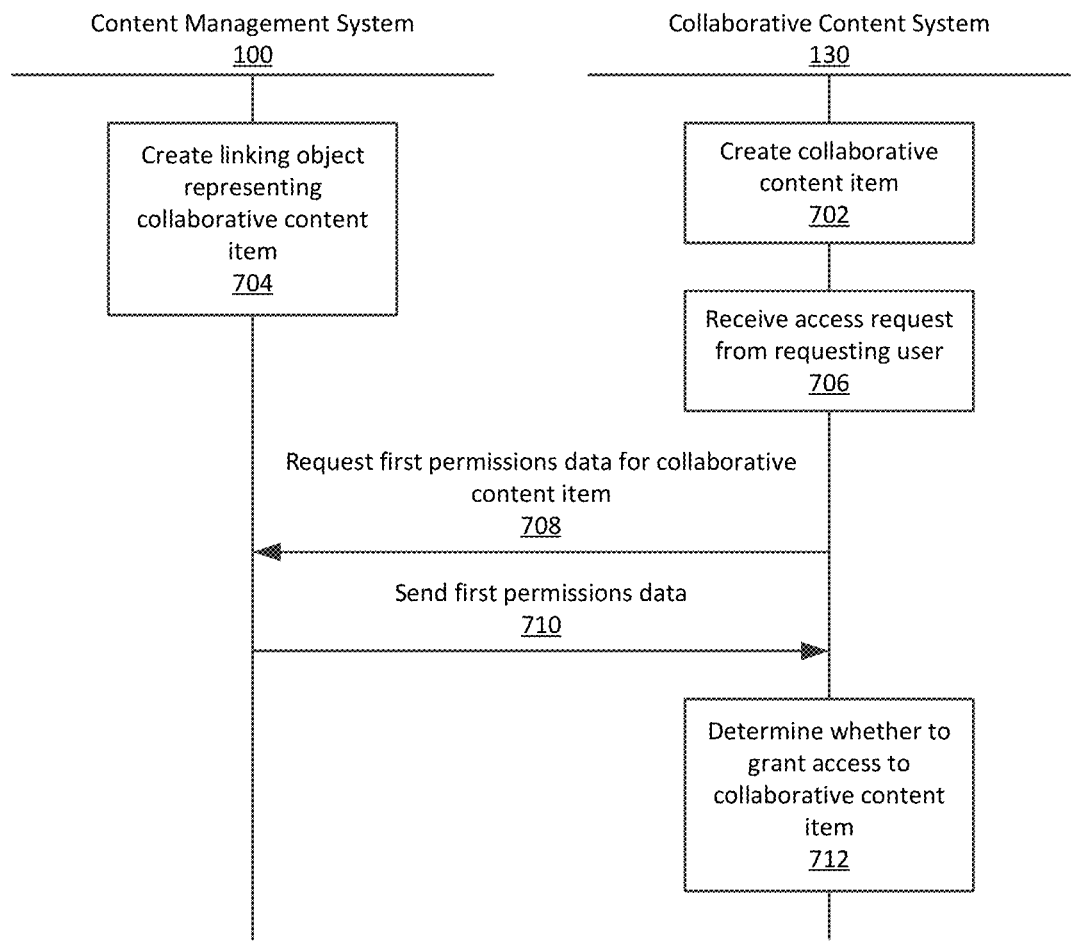
FIG. 7 shows an interaction diagram of an example process for outsourcing access permissions for a collaborative content item from the collaborative content system to the content management system, according to one example embodiment.

Outsourcing Access Permissions for Collaborative Content Items to Content Management System FIG. 7 shows an interaction diagram of an example process for outsourcing access permissions for a collaborative content item from collaborative content system 130 to content management system 100, according to one example embodiment. In other embodiments, the process may include additional, fewer, or different steps, and the steps shown in FIG. 7 may be performed in a different order.

Collaborative content system 130 creates 702 a collaborative content item in response to a request from a creating user, and content management system 100 creates 704 a linking object representing the collaborative content item. In some embodiments, the linking object is created by content management system 100 automatically (e.g., in response to the creation of the collaborative content item), in response to a request from collaborative content system 130, in response to a request from the user (e.g., a request to create the collaborative content item via content management system 100 or a request to save the collaborative content item within a user account at content management system 100), in response to the collaborative content item being shared with a user of content management system 100, or in response to any other suitable criteria.

As noted above, the collaborative content item is stored on collaborative content system 130, and the linking object is stored on content management system 100. The linking object is an item of data that includes a link to the collaborative content item. In one embodiment, the link is an identifier that uniquely identifies the collaborative content item on collaborative content system 130. In another embodiment, the link is a location of the item within collaborative content system 130. The linking object may also include other metadata for the collaborative content item, such as the name of the collaborative content item, one or more thumbnail images representing the content of the collaborative content item, or a date and time at which the collaborative content item was last edited.

The creating user can create the collaborative content item by interacting with an interface provided by content management system 100. More specifically, content management system 100 receives a request from the creating user to create a collaborative content item (e.g., via interactions with a user interface provided by content management system 100). In response, content management system 100 can create the linking object in a user account associated with the creating user. Content management system 100 may also redirect the creating user to collaborative content system 130 in response to the request so that the creating user can begin editing the collaborative content item.

After receiving the request to create the collaborative content item, content management system 100 may prompt the creating user to identify a set of users who will have access to the collaborative content item. For example, content management system 100 displays an interface that prompts the creating user to provide a name or email address for each user in the set of users.

Content management system 100 generates permissions data based on the set of users identified by the creating user and stores the permissions data in association with the collaborative content item. As referred to herein, permissions data comprises a set of user identifiers that uniquely identify each user that can access the collaborative content item. For example, the permissions data can specify an email address, user account identifier, or some other item of identifying information for each user. The permissions data can also specify an access level that defines the extent to which each user can access the collaborative content item. For instance, each access level can specify that the corresponding user has read-only access, read and write access, editing access, or administrative access (e.g., the ability to read, write, and change permissions data for the content item). In some embodiments, collaborative content system 130 stores separate permissions data for the collaborative content item. The separate permissions data stored by collaborative content system 130 may include identifiers for additional, fewer, or different users. For ease of description, the permissions data stored by content management system 100 is hereinafter referred to as first permissions data, and the permissions data stored by collaborative content system 130 is referred to as second permissions data.

In one embodiment, content management system 100 stores the first permissions data in direct association with the linking object. In other words, the permissions data is associated with the linking object and is not associated with any other object or content item on content management system 100.

In another embodiment, the linking object is stored within a folder that is capable of storing additional content items, and content management system 100 stores the first permissions data in association with the folder. The first permissions data applies to each item within the folder, including the linking object. In this embodiment, content management system 100 may optionally omit the capability of storing permissions data in direct association with the linking object and thus rely solely on folder-level permissions data.

The folder may be created before the linking object is created. For example, a first user creates the folder and identifies a set of users who will have access to the folder. In response, content management system 100 generates the first permissions data based on the identified set of users in the same manner as described above and stores first permissions data in association with the folder. At some point after creating the folder (e.g., a few days later), the first user adds the linking object to the folder (e.g., by moving the linking object into the folder from another folder or by creating the linking object in the folder). After the linking object is added to the folder, each user identified in the first permissions data associated with the folder may access the collaborative content item.

The folder may also be created by a different user than the user who adds the linking object to the folder. For example, the first user creates the folder and identifies a set of users who will have access to the folder, and content management system 100 generates and stores first permissions data in the same manner as described above. The permissions data includes an identifier for a second user (i.e., different from the first user). The second user can then add the linking object to the folder (e.g., by moving the linking object into the folder from another folder or by creating the linking object in the folder). Similar to the example described above, each user identified in the first permissions data associated with the folder may access the collaborative content item after the linking object is added to the folder.

The creating user may alternatively create the collaborative content item by interacting with the collaborative interface provided by collaborative content system 130, as described above with reference to FIG. 4. In this case, collaborative content system 130 creates 702 the collaborative content item in a user account on the system 130 associated with the creating user. Collaborative content system 130 can also send a link to the collaborative content item to content management system 100. In response, content management system 100 creates 704 a linking object in a user account on content management system 100 associated with the creating user. Collaborative content system 130 may similarly prompt the creating user to identify a set of users who will have access to the collaborative content item and may generate the second permissions data based on the identified set of users.

Collaborative content system 130 receives 706 an access request from a requesting user. The access request is a request by the requesting user to access the collaborative content item. For example, the requesting user may request access to the collaborative content item by selecting a hyperlink to the collaborative content item, by selecting a linking object corresponding to the collaborative content item from an interface displayed by content management system 100, or by any other suitable means.

In response to receiving 706 the access request, collaborative content system 130 requests 708 the first permissions data for the collaborative content item from content management system 100. Upon receiving the request 708, content management system 100 sends 710 the first permissions data for the collaborative content item back to collaborative content system 130. The request 708 for the first permissions data includes an identifier for the collaborative content item that allows content management system 100 to locate the linking object representing the collaborative content item. In one embodiment, content management system 100 provides an application programming interface (API) that returns data associated with a collaborative content item, including the first permissions data, upon receiving an API call that specifies an identifier for the collaborative content item. In this embodiment, the request 708 for the first permissions data is an API call to the API provided by content management system 100, and content management system 100 sends 710 the first permissions data as part of the data returned by the API.

Collaborative content system 130 determines 712 whether to grant access to the collaborative content item to the requesting user. In some embodiments, collaborative content system 130 makes the determination based on both the first permissions data received 710 from content management system 100 and the second permissions data stored by collaborative content system 130. For example, access is granted to the requesting user if an identifier for the requesting user is present in both the first permissions data and the second permissions data. Alternatively, access is granted to the requesting user if an identifier for the requesting user is present in at least one of the first permissions data and the second permissions data. In other embodiments, collaborative content system 130 does not separately maintain any permissions data for the collaborative content item, and the system 130 grants access to the requesting user if an identifier for the requesting user is present in the first permissions data. This allows the system 130 to implement a mechanism for denying access to the collaborative content item (e.g., if an identifier for the requesting user is not present in the first permissions data) even if the system 130 does not independently restrict access to the collaborative content item.

Figure 8:
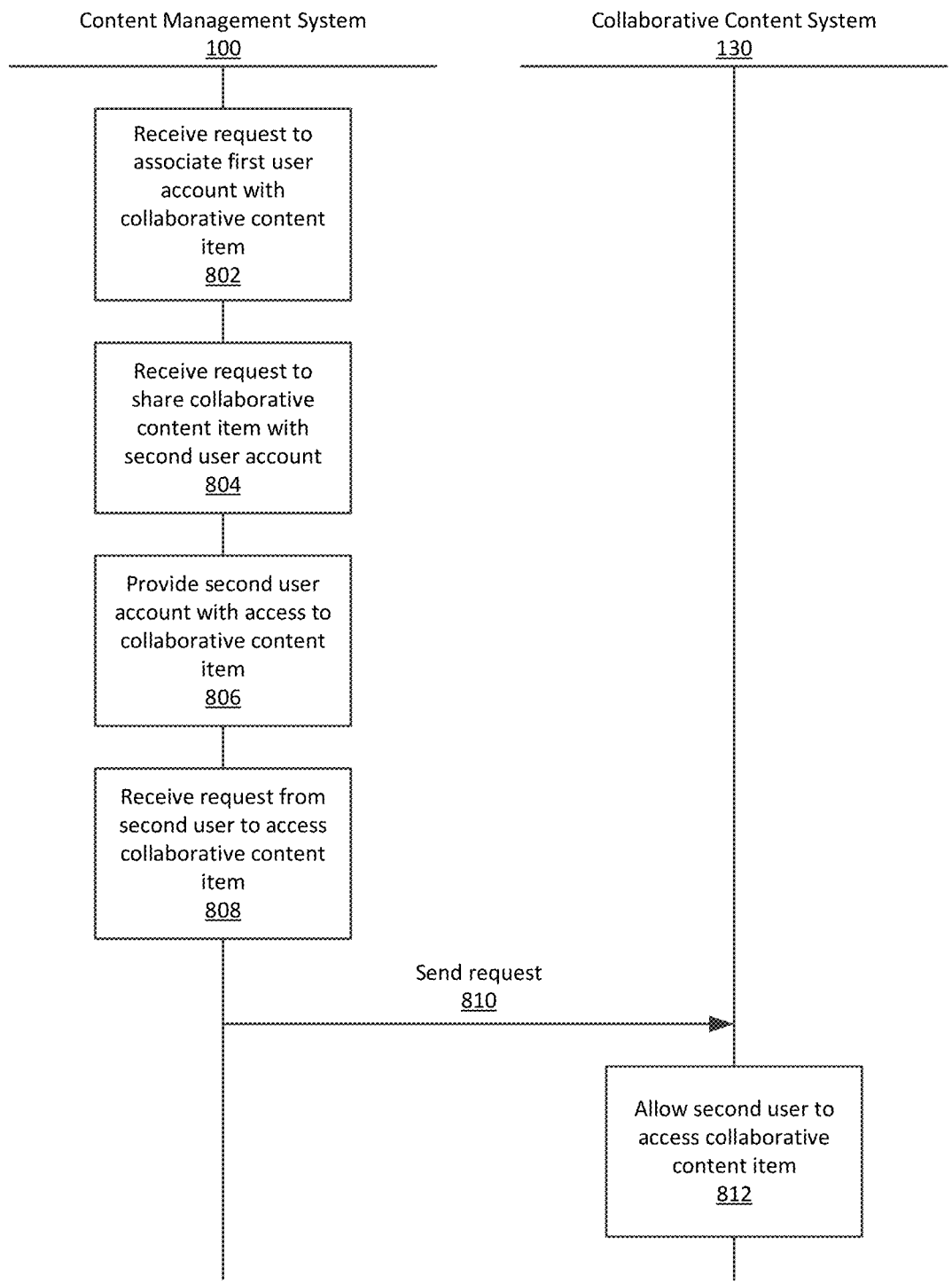
FIG. 8 shows an interaction diagram of an example process for outsourcing account storage capacity for a collaborative content item from the content management system to the collaborative content system, according to one example embodiment.

Outsourcing Account Storage Capacity from Content Management System to Collaborative Content System FIG. 8 shows an interaction diagram of an example process for outsourcing account storage capacity for a collaborative content item from content management system 100 to collaborative content system 130, according to one example embodiment. In other embodiments, the process may include additional, fewer, or different steps, and the steps shown in FIG. 8 may be performed in a different order.

Content management system 100 receives 802 a request to associate a first user account with a collaborative content item that is stored on collaborative content system 130. For instance, the request may be received as part of a user interaction to create the collaborative content item. For example, the first user may interact with an interface provided by collaborative content system 130 to create a new collaborative content item. In response to the interaction, collaborative content system 130 sends a request to associate the first user's account on content management system 100 with the collaborative content item. As another example, the first user may interact with an interface provided by content management system 100 to create a new collaborative content item, in which case the first user's interactions with the interface constitute the request to associate the first user account with collaborative content system 130.

Upon receiving the request, content management system 100 creates a linking object representing the collaborative content item. As noted above with reference to FIG. 7, the linking object includes a link to the collaborative content item on collaborative content system 130, and the linking object is stored in the first user account on content management system 100. The linking object can be stored alongside other types of content items in the first user account. When the first user interacts with the link (e.g., by selecting the linking object), the first user is redirected from content management system 100 to collaborative content system 130. For example, interacting with the link causes the first user's client device to open the collaborative content item within a web browser application and an interface hosted by collaborative content system 130.

Content management system 100 receives 804 a request to share the collaborative content item with a second user account and provides 806 the second user account with access to the collaborative content item. The request identifies the collaborative content item and the second user account. For example, the request may be sent by the collaborative content system 130 after a user interacts with an interface provided by collaborative content system 130 to share the collaborative content item with the second user account. As another example, the request may be received from a user of content management system 100 as part of an interaction with content management system 100. For instance, the first user may request to share the content item with the second user account by modifying the first permissions data to add an identifier for the second user account. As noted above, the first permissions data may be associated directly with the linking object or with a folder in which the linking object is stored. Alternatively, the first user may request to share the content item with the second user account by interacting with an interface to move the linking object into a shared folder on content management system 100 whose permissions data already includes an identifier for the second user account, in which case the linking object adopts the permissions data corresponding to the shared folder.

The first user account and the second user account are associated with a first storage capacity and a second storage capacity, respectively. The storage capacity for a user account represents the maximum amount of data that can be stored by content management system 100 for the user account. Thus, when a user stores content items such as document files, image files, and movie files in his or her user account on content management system 100, the size of each content item is ordinarily counted against the storage capacity for the user account.

However, in some embodiments, content management system 100 does not count the storage space occupied by the collaborative content item against the storage capacity for either the first user account or the second user account. The operator of content management system 100 may wish to configure content management system 100 in this manner because—unlike other types of content items, which are stored on content management system 100—the collaborative content item is stored on collaborative content system 130 and thus does not occupy any storage space on content management system 100. Instead, content management system 100 simply stores the linking object that contains a link to the collaborative content item, which occupies significantly less storage space.

In some embodiments, when the second user account is provided 806 access to the collaborative content item, neither content management system 100 nor collaborative content system 130 creates a duplicate copy of the collaborative content item. Instead, the second user account is granted access to the linking object (e.g., modifying the first permissions data or by moving the linking object into a shared folder that is accessible to the second user account, as noted above), which allows the second user to access the collaborative content item on collaborative content system 130. Thus, both the first user and the second user access the same copy of the collaborative content item, which advantageously saves storage space on collaborative content system 130 and negates the need to synchronize edits between two separate copies of the collaborative content item.

Figure 9:
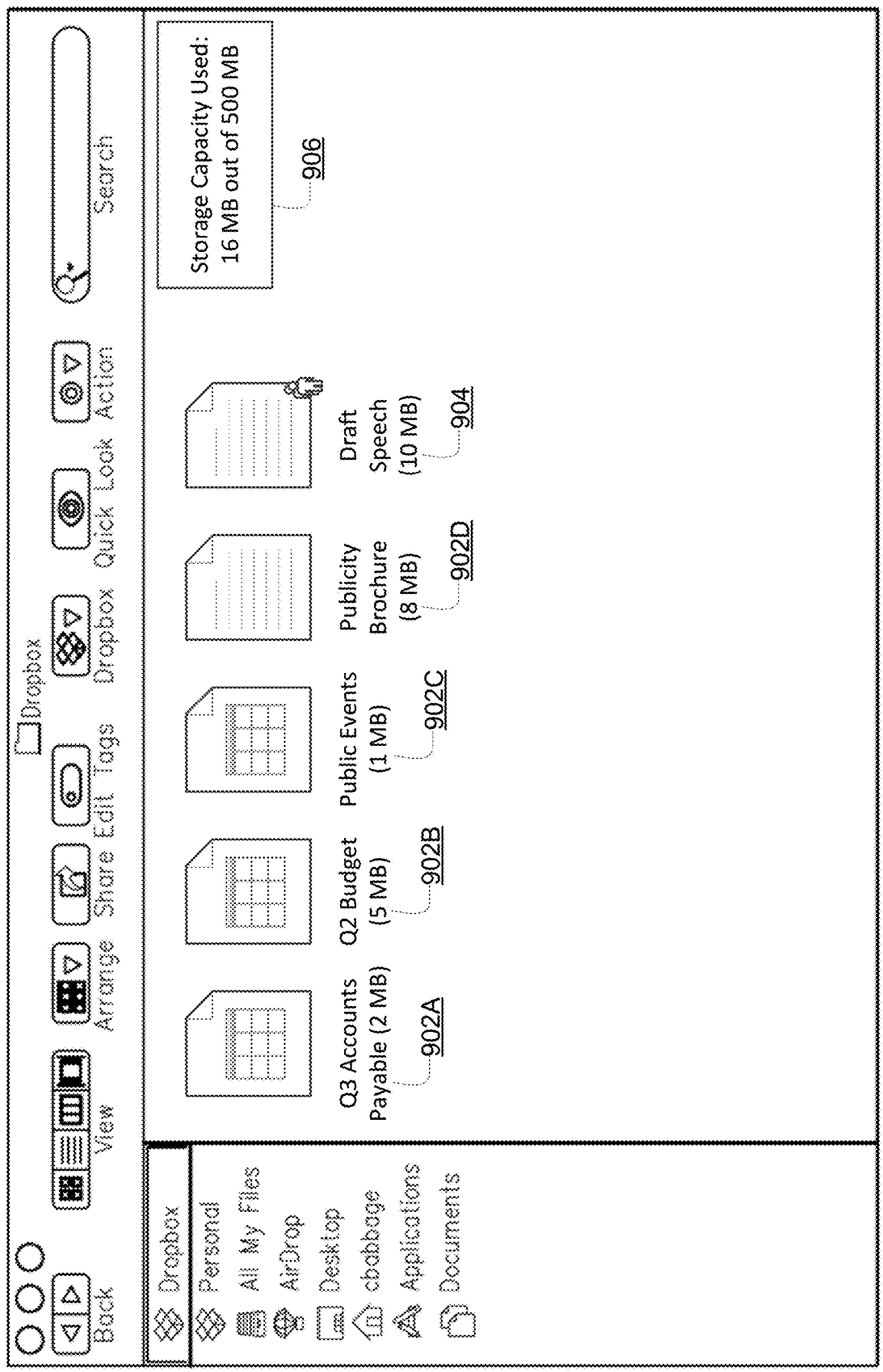
FIG. 9 shows an example user interface of the content management system containing a plurality of collaborative content items, according to one example embodiment.

Referring to FIG. 9, illustrated is an example user interface that displays content items in a user account of content management system 100 (e.g., the first user account or the second user account as described with reference to FIG. 8). As shown in FIG. 9, several content items are stored in the user account, including three spreadsheet files 902A through 902C and a document file 902D. The user account also stores a linking object 904 that represents the collaborative content item shown in FIGS. 5A and 5B. Thus, when the user interacts with the linking object 904, the user is redirected to the interface shown in FIGS. 5A and 5B so that the user can view and edit the collaborative content item.

The user interface shown in FIG. 9 also includes an interface element 906 that displays the storage presently occupied by the content items stored in the user account and also displays the storage capacity of the user account. Here, the storage capacity of the user account is 500 MB. The four content items 902A through 902D, which occupy a total of 16 MB, are counted against the storage capacity of the user account. However, the collaborative content item (represented by the linking object 904), which has a size of 10 MB, is not counted against the storage capacity of the account. In the embodiment shown in FIG. 9, the interface displays the size of the collaborative content item to provide the user with an indication of the amount of content that has already been added to the collaborative content item. However, in other embodiments, the interface may instead display the size of the linking object 904 (which is relatively small, e.g., 32 KB) to indicate to the user that the linking object 904 is merely a link to the collaborative content item.

Referring back to FIG. 8, the second user can request 808 to access the collaborative content item via an interface of content management system 100 after the second user account is provided 806 access to the collaborative content item. For example, the second user can interact with the linking object representing the collaborative content item by clicking or tapping on the linking object. The access request is sent 810 from content management system 100 to collaborative content system 130, and collaborative content system 130 allows 812 the second user to access the collaborative content item.

Additional Configuration Considerations

Although the processes shown in FIGS. 7 and 8 are described above with reference to collaborative content items stored on a collaborative content system, these processes may also be applied to enable interoperability between content management system 100 and a content storage system that stores a different type of content and has different functionality than collaborative content system 130. For example, the content storage system may instead store multimedia content items such as videos and images but does not implement any collaborative content creation functionality for the stored multimedia content items. In this embodiment, when a requesting user attempts to access a multimedia content item via the content storage system, the content storage system requests permissions data from the content management system in the same manner as described in FIG. 7 and determines whether to grant access to the requesting user based on the permissions data. Similarly, a user account on content management system 100 may store a linking object representing a multimedia content item on the content storage system without having the size of the multimedia content item counted against the user account's storage capacity on content management system 100.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
receiving, at a collaborative content system, an access request from a requesting user to access a collaborative content item stored at the collaborative content system;
responsive to receiving the access request, transmitting, by the collaborative content system, over a data network, to a content management system that is separate from the collaborative content system and that operates independently from the content management system, a request for first permissions data associated with the collaborative content item, the first permissions data identifying a set of users that can access the collaborative content item, the request comprising an application programming interface (API) call including an identifier for the collaborative content item;

responsive to transmitting the request, receiving, by the collaborative content system, from the content management system, the first permissions data associated with the collaborative content item, the first permissions data being identified using the identifier for the collaborative content item;

determining, by the collaborative content system, whether to grant access to the collaborative content item to the requesting user based at least in part on whether the requesting user is identified by the first permissions data; and responsive to determining to grant access to the collaborative content item to the requesting user, sending, by the collaborative content system, the collaborative content item to the requesting user.

2. The computer-implemented method of claim 1, wherein the content management system stores an identifier for the collaborative content item as an object within a folder stored by the content management system, the folder including one or more objects, wherein the first permissions data is stored by the content management system, and wherein the first permissions data is associated with the folder such that each of the identified set of users can access the objects included within the folder.

3. The computer-implemented method of claim 1, wherein the collaborative content system stores second permissions data identifying a second set of users that can access the collaborative content item.

4. The computer-implemented method of claim 3, wherein determining whether to grant access to the collaborative content item comprises granting access to the requesting user only if the requesting user is identified by both the first permissions data and the second permissions data.

5. The computer-implemented method of claim 3, wherein determining whether to grant access to the collaborative content item comprises granting access to the requesting user only if the requesting user is identified by at least one of the first permissions data and the second permissions data.

6. The computer-implemented method of claim 1, wherein determining whether to grant access to the collaborative content item comprises denying access to the requesting user if the first permissions data does not identify the requesting user even if the collaborative content system does not restrict access to the collaborative content item.

7. The computer-implemented method of claim 1, wherein the collaborative content item is created at the collaborative content system in response to a request from a creating user received by the content management system, wherein the content management system is configured to create an object comprising an identifier for the collaborative content item and is further configured to redirect the creating user to the collaborative content system in response to the request from the creating user.

8. The computer-implemented method of claim 7, wherein the content management system is configured to prompt the creating user to identify the set of users that can access the collaborative content item in response to the request from the creating user, and wherein the content management system is configured to create the first permissions data in response to the creating user identifying the set of users.

9. The computer-implemented method of claim 1, wherein the content management system and the collaborative content system comprise physically separated computing systems.

10. A computer-implemented method comprising:
receiving, by a content management system, from a collaborative content system that is separate from the content management system and that is capable of operating independently from the content management system, a request for first permissions data associated with a collaborative content item stored on the collaborative content system, the request sent by the collaborative content system responsive to the collaborative content system receiving an access request from a requesting user to access the collaborative content item, the request comprising an application programming interface (API) call including an identifier for the collaborative content item;

responsive to receiving the request, identifying, by the content management system, an object comprising the identifier for the collaborative content item, the object stored on the content management system in association with the first permissions data; and sending, by the content management system, over a data network, the first permissions data to the collaborative content system, the first permissions data identifying a set of users that can access the collaborative content item, wherein the collaborative content system is configured to determine whether to grant access to the collaborative content item to the requesting user based at least in part on whether the requesting user is identified by the first permissions data, and wherein the collaborative content system is configured to, responsive to determining to grant access to the collaborative content item to the requesting user, send the collaborative content item to the requesting user.

11. The computer-implemented method of claim 10, wherein the object is stored by the content management system within a folder on the content management system, the folder including one or more objects, and wherein the first permissions data is associated with the folder such that each of the identified set of users can access the objects included within the folder.

12. The computer-implemented method of claim 10, further comprising:
receiving, by the content management system, a request from a creating user to create the collaborative content item;
responsive to receiving the request, creating, by the content management system, the object comprising the identifier for the collaborative content item; and
redirecting the creating user to an interface of the collaborative content system that allows the creating user to access the collaborative content item.

13. The computer-implemented method of claim 12, further comprising:
responsive to receiving the request, prompting, by the content management system, the creating user to identify the set of users that can access the collaborative content item; and
creating, by the content management system, the first permissions data based on the identified set of users.

14. The computer-implemented method of claim 10, wherein content management system and the collaborative content system comprise physically separated computing systems.

15. A non-transitory computer-readable storage medium storing instructions that, when executed by a computing system, cause the computing system to perform operations comprising:
- receiving, at a content storage system, an access request from a requesting user to access a content item stored at the content storage system;
- responsive to receiving the access request, transmitting, by the content storage system, over a data network, to a content management system that is separate from the collaborative content system and that is capable of operating independently from the content management system, a request for first permissions data associated with the content item the first permissions data identifying a set of users that can access the content item, the request comprising an application programming interface (API) call including an identifier for the collaborative content item;
- responsive to transmitting the request, receiving, by the content storage system, from the content management system, the first permissions data associated with the content item, the first permission data being identified using the identifier for the collaborative content item; and
- determining, by the content storage system, whether to grant access to the content item to the requesting user based at least in part on whether the requesting user is identified by the first permissions data; and
- responsive to determining to grant access to the collaborative content item to the requesting user, sending, by the collaborative storage system, the collaborative content item to the requesting user.

16. The computer-readable storage medium of claim 15, wherein the content storage system stores second permissions data identifying a second set of users that can access the content item.

17. The computer-readable storage medium of claim 16, wherein determining whether to grant access to the content item comprises granting access to the requesting user only if the requesting user is identified by both the first permissions data and the second permissions data.

18. The computer-readable storage medium of claim 16, wherein determining whether to grant access to the content item comprises granting access to the requesting user only if the requesting user is identified by at least one of the first permissions data and the second permissions data.

* * * * *